US012560027B2

(12) United States Patent
Lee

(10) Patent No.: US 12,560,027 B2
(45) Date of Patent: Feb. 24, 2026

(54) MODULAR LADDER FOR STEALTH CELL TOWERS

(71) Applicant: T-Mobile USA, Inc., Bellevue, WA (US)

(72) Inventor: Joseph Lee, Atlanta, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 792 days.

(21) Appl. No.: 17/881,398

(22) Filed: Aug. 4, 2022

(65) Prior Publication Data

US 2024/0044207 A1 Feb. 8, 2024

(51) Int. Cl.
*E06C 9/14* (2006.01)
*B66B 20/00* (2006.01)
*E06C 7/12* (2006.01)

(52) U.S. Cl.
CPC ................ *E06C 9/14* (2013.01); *B66B 20/00* (2013.01); *E06C 7/12* (2013.01)

(58) Field of Classification Search
CPC ..... A62B 1/06; E06C 9/14; E06C 7/12; E06C 1/56; B66B 20/00
See application file for complete search history.

(56) References Cited

U.S. PATENT DOCUMENTS

| | | | | | |
|---|---|---|---|---|---|
| 3,968,858 | A * | 7/1976 | Vollan | A63B 27/00 182/135 | |
| 4,193,476 | A * | 3/1980 | Emmons | E06C 1/36 182/189 | |
| 5,072,807 | A * | 12/1991 | Fujita | E06C 9/14 182/42 | |
| 2003/0085073 | A1* | 5/2003 | Takeshima | A62B 1/06 182/70 | |
| 2013/0341122 | A1* | 12/2013 | Maurer | B66B 9/187 187/239 | |
| 2014/0069741 | A1* | 3/2014 | Bergmann | F03D 80/50 182/241 | |
| 2016/0115737 | A1* | 4/2016 | O'Donnell | E06C 7/003 29/426.1 | |
| 2017/0174482 | A1* | 6/2017 | Lee | B66D 1/36 | |
| 2022/0363347 | A1* | 11/2022 | Bolline | E06C 9/14 | |

* cited by examiner

*Primary Examiner* — Brian D Mattei
(74) *Attorney, Agent, or Firm* — Lee & Hayes, P.C.

(57) ABSTRACT

Systems and methods for providing access for workers to cell towers are disclosed. The system is useful on "stealth" cellular towers that do not have external ladders or climbing pegs for aesthetic reasons. The system may include a channel (e.g., a track) that may be permanently mounted to the cell tower and extends from a bottom of the cell tower to a top of the cell tower as well as a track-line (e.g., a chain, a belt, etc.) located within the channel such that the track-line acts as a loop running from the bottom of the cell tower to the top of the cell tower, and vice versa. A modular ladder with climbing pegs may be attached to the track-line and inserted into the channel such that the modular ladder may be pulled up the channel to the top of the cell tower by the track-line and then secured.

20 Claims, 6 Drawing Sheets

MODULAR LADDER FOR STEALTH CELL TOWERS

BACKGROUND

Cellular data and voice networks are made possible by transmitting data wirelessly using transceivers in a cellular device, such as a cell phone, and transceivers located on tall towers, commonly referred to as, "cell towers." The transmission range for cellular devices and cell towers, however, is limited. The limited range is due to a number of factors including, but not limited to, the available frequency spectrum for cellular communications, transceiver size and power, battery power, and interference from other transmission. In addition, each cell tower has a finite bandwidth capacity.

As a result, cell towers must be placed throughout the coverage area to ensure that a user is always, or almost always, within range of a cell tower. In addition, the number of cell towers should be such that each cell tower has sufficient bandwidth to support the number and type of users in the area. Unfortunately, cell towers can be somewhat less than aesthetically pleasing. Thus, cell towers may be frowned upon in urban areas due to the number of people that see them and space constraints, among other things.

To this end, "stealth" cell towers are often used that mimic trees, church steeples, and other structures. In this manner, cell towers can be installed, yet remain largely unnoticed. A cell tower disguised as a pine tree and installed in a stand of pine trees, for example, may be all but invisible to the casual observer.

To access the top of cell towers—for maintenance and repairs, for example—cell towers generally have climbing pegs, ladders, or other means for workers to manually climb the tower. Unfortunately, to remain stealthy, it is preferable that stealth cell towers do not have this feature because pine trees, for example, do not generally have climbing pegs. To access the top of a stealth cell tower, therefore, maintenance crews are generally required to bring in a cherry picker or crane to access the top of the cell tower.

Indeed, some cell towers can be 250 feet tall, or more. In addition, cell towers can be installed in inaccessible locations or in mountainous terrain. The cost to rent a crane that is large enough to reach these heights is considerable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
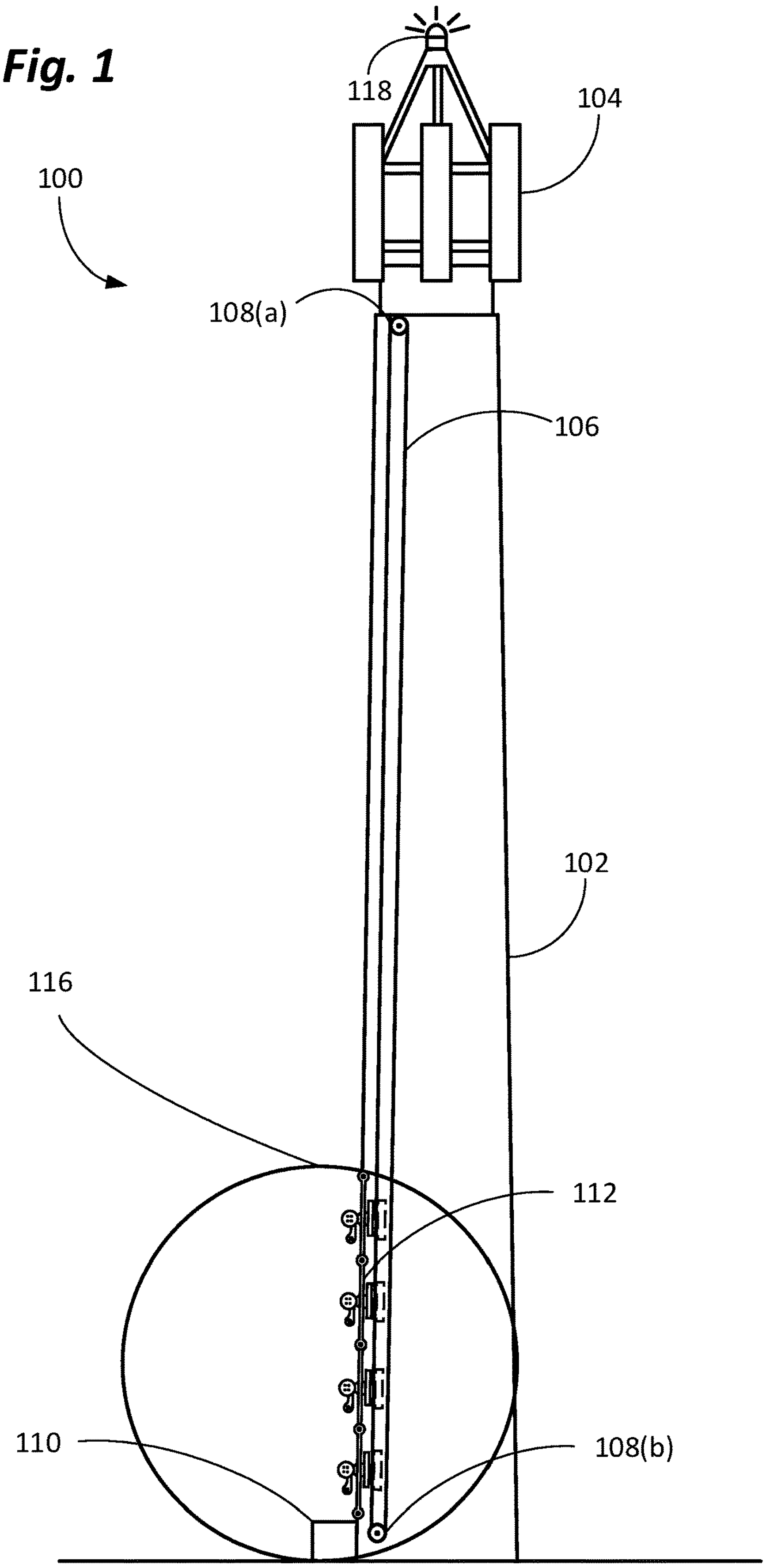
FIG. 1 is a cross-sectional view of a cell tower with a self-contained modular ladder, in accordance with some examples of the present disclosure.

Examples of the present disclosure can comprise a system for enabling a worker access to the top of a cell tower. The system may include a channel (e.g., a track) that may be permanently mounted to the cell tower and extends from a bottom of the cell tower to a top of the cell tower as well as a track-line (e.g., a chain, a belt, etc.) located within the channel such that the track-line acts as a loop running from the bottom of the cell tower to the top of the cell tower, and vice versa. A modular ladder may be attached to the track-line and inserted into the channel such that the modular ladder may be pulled up the channel to the top of the cell tower by the track-line and then secured. The modular ladder may include multiple climbing pegs configured to couple together such that the modular ladder can be adjusted for length based on the size of the cell tower. The system may also include a lock-box at the bottom of the cell tower including a powered mechanism usable to activate the track-line and usable to securely store the modular ladder when not in use. The modular ladder may be collapsible such that when the track-line is running down the channel and pulling the modular ladder away from the top of the cell tower, the modular ladder may fold into the lock-box, thereby preventing access to the cell tower from unwanted visitors as well as maintaining the stealth appearance of the cell tower.

A majority of the functional components of a cell tower are located at the top. A cell tower can comprise, for example, multiple antennas, transceivers, digital switches, and a beacon. Many of these components are "wear" items. Bulbs burn out in beacons and switches fail over time. Many of these components are inexpensive to purchase and easy to replace once the worker is on top of the cell tower.

Cell towers are generally between 100 and 250 feet tall. As mentioned above, "stealth" cell towers, or towers that are disguised as something else, often do not have ladders, climbing pegs, or other means for workers to manually climb to the top. This is obviously so that the tower looks more like what it is intended to look like (e.g., a pine tree), but can also be due to local ordinances or covenants. As a result, many of these towers can only be accessed with a crane.

In addition, cell towers can be installed in remote areas or surrounded by trees or hilly or uneven terrain. This can increase the size and cost of the crane required significantly, for example, by requiring that the crane park in an adjacent location (e.g., a parking lot) and reach over to the tower. In addition, due to travel and setup time, cranes often have minimum charges (e.g., a minimum of 4 hours at $1000/hour) regardless of how long they are actually used. Thus, while a new bulb for a beacon or a new digital switch may be less than $100 and take five minutes to replace, the crane rental required to replace it can cost $3,000, $10,000, or more.

It would be advantageous, therefore, to provide a modular ladder system that is self-contained in, or on, the cell tower itself. The system should be simple, safe, robust, and relatively inexpensive. It is to such a system that examples of the present disclosure are primarily directed.

Examples of the present disclosure comprise a system 100 for enabling a worker access to the top of a cell tower, antenna, or other tall structure. FIG. 1 depicts a typical cell tower 102—i.e., without "stealth" features—for clarity. The system is equally applicable to either type of cell tower or, indeed, other types of towers and tall structures, but is particularly useful for stealth towers that often do not have permanently installed climbing pegs or ladders, for example.

The tower 102 can include a plurality of antennas 104, and other electronic equipment mounted at the top of the tower 102 that needs periodic service. To facilitate this service, therefore, the system 100 can also include a transit-line 106 (e.g., a cable, a chain, a belt, etc.), and one or more pulleys 108 (e.g., pulley 108*a* and 108*b*). In some examples, a portion of the system 100 can be at ground level, outside the tower and thus, can be stored in a box 110. In some examples, the system 100 can also include a channel within which a portion of the transit-line 106 and a modular ladder 112 can travel.

The transit-line 106 may have a length that is equal to at least twice a height of the tower 102 and form a loop around the pulleys 108. The transit-line 106 can comprise a suitably strong and flexible material such as, for example, nylon, polyester, or Spydura® rope. In some cases, the transit-line 106 can comprise stainless steel (e.g., a chain or a cable) or galvanized aircraft cable.

Figure 2:
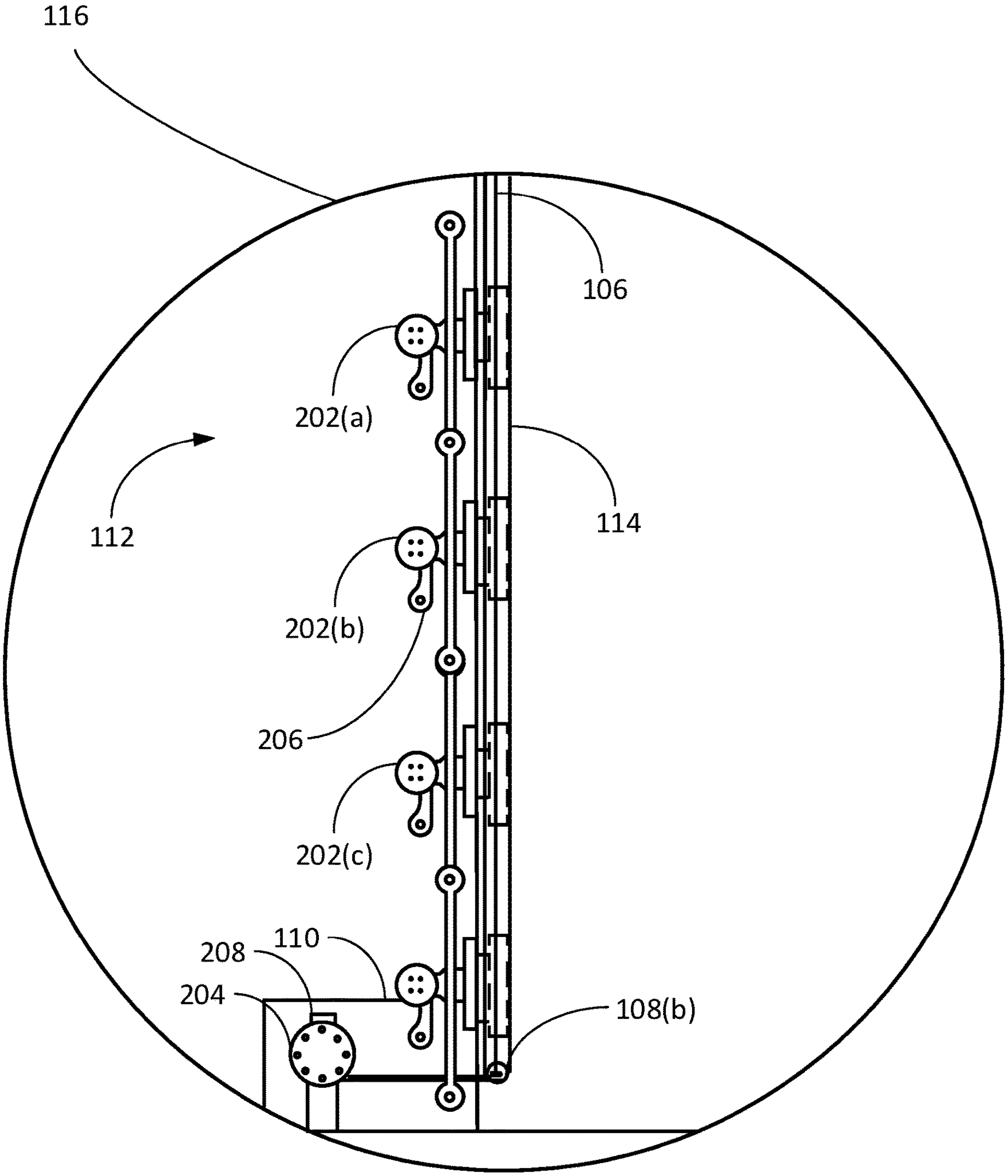
FIG. 2 is a detailed view of a bottom view of the self-contained modular ladder, in accordance with some examples of the present disclosure.

In some examples, to facilitate the deployment of the transit-line 106 and the modular ladder 112, the pulley 108B may be coupled to a motor (as illustrated in FIG. 2) located within the box 110. When the motor is activated in a first direction, the pulley 108B may turn such that the transit-line moves up the tower 102. When the motor is activated in a second direction that is opposite the first direction, the transit-line 106 may travel down the tower 102 towards the box 110. In this way, the modular ladder 112 may travel out of the box 110 and up the tower 102 when in use, and retracted down the tower 102 back into the box 110 when not in use. In some examples, the tower 102 can also comprise a beacon 118 to alert local air traffic of the location of the tower 102.

FIG. 2 depicts a detailed view 116 of the bottom portion of the system 100. Cell towers generally contain a plurality of wires and cables inside the tower 102. This can include, for example, coaxial, fiber optic, Ethernet, and power wires. It is possible, if left uncontrolled, therefore, that the transit-line 106 for the system 100 could damage the cables inside the tower 102. To this end, in some examples, the transit-line 106 can travel inside a channel 114. The channel 114 can be mounted on the inside or outside of the tower 102 with a plurality of mounts. The mounts can comprise, for example, brackets, I-bolts, or clamps to affix the channel 114 to the tower 102. It is preferable that the channel 114 be substantially straight to prevent excessive wear from the transit-line 106 rubbing on the inside of the channel 114 during use. In some examples, it may be preferable to mount the channel 114 on the inside of the tower 102 to provide protection from the elements, among other things. In other examples, it may be preferable to mount the channel 114 on the outside of the tower to facilitate installation, for example.

Of course, because the transit-line 106 can be fairly flexible, perfect alignment is not required. Indeed, substantial bends could be introduced into the channel 114 to, for example, avoid existing structures or components in the tower 102. In this case, the channel 114 can comprise wear pads, for example, in locations where the transit-line 106 contacts the channel 114. The wear pads can be sufficiently hard that they are not significantly affected by the transit-line 106 or could be replaceable (i.e., "sacrificial"). The channel 114 can comprise, for example, square or round pipe. The channel 114 can comprise steel, aluminum, iron, or PVC, among other things.

The system 100 can also include a plurality of pulleys 108, such as the pulley 108(*a*) located at the top of the tower 102 (illustrated in FIG. 1) and they pulley 108(*b*) located at the bottom of the tower 102 to guide the transit-line 106. In this manner, the transit-line 106 can travel vertically up the tower 102 inside the channel 114, turn 180 degrees over the first pulley 108*a*, and then travel back down the outside of the tower. This pulley configuration can be achieved using a material (e.g., cable, chain, etc.) that is sufficiently flexible and resilient to be turned 180 degrees in a relatively small radius.

As shown, the modular ladder 112 may include multiple climbing pegs 202(*a*), 202(*b*), and 202(*c*) (collectively referred to as climbing pegs 202) configured to couple together such that the modular ladder 112 can be adjusted for length based on the size of the tower 102. In some cases, the climbing pegs may be coupled together via a pin and/or a bolt such that the modular ladder is flexible when being taken down the tower 102. For example, as a motor 204 activates the pulley 108(*b*) causing the transit-line 106 to move down the tower, the modular ladder 112 may be configured to travel down the tower 102 and into the box 110, folding upon itself as the climbing pegs 202 are able to pivot at each connection point. The box 110 may comprise a lock box configured to secure the contents of the box 110 in order to prevent tampering or usage of the contents from unwanted persons.

In some cases, the climbing pegs 202 may include a fall protection loop 206 configured to couple with a safety harness of an entity climbing (in some cases referred to as "scaling") the tower 102. In some embodiments, although not illustrated, the system 100 may include a safety cable fixed to the tower and extending from the top of the tower to the bottom of the tower proximate to the modular ladder 112. The safety cable may be configured to couple with a safety mechanism (e.g., a cable grab) coupled to a safety harness of an entity climbing the tower.

The motor 204 (in some cases referred to as powered motor 204) can comprise, for example, an electric, hydraulic, or pneumatic motor for activating the transit-line 106 and for lifting the modular ladder 112 up the tower 102. As such, the motor 204 can have a sufficient power rating to pull the transit-line 106 and the modular ladder 112 without overheating or failing. In some examples, the motor 204 can have power in excess of what is required to provide a safety margin. In some cases, the motor 204 may include a brake 208 that can use the motor 204. In other words, the motor 204 can include electronics to make the motor 204 provide an opposing force to the transit-line 106 being activated. This can be achieved, for example, by reversing the polarity of the motor 204 (if electric) or reversing the flow of fluid to the motor (if hydraulic or pneumatic) 204 in order to cause the transit-line 106 to travel in opposite directions.

In other examples, the motor 204 can include a physical brake 208. In this configuration, the brake 208 can act on a drum of the motor 204 or directly on the transit-line 106. In some examples, the brake 208 can comprise a caliper, for example, that acts directly on a flange on the drum of the motor 204. In other examples, the brake 208 can comprise a clamp, or other means, that applies friction directly on the transit-line 106. The brake 208 can enable the ascent of the modular ladder 112 to the top of the tower and/or the descent of the modular ladder 112 from the top of the tower 102 to be slowed or stopped. In some examples, the brake 208 can also hold the transit-line 106 and the modular ladder 112 in the retracted position when not in use. That is, the break 208 may disable movement of the modular ladder 112 when being stored in the box 110. In some cases, when the modular ladder 112 is stored in the box 110 (e.g., in the retracted position) the modular ladder 112 may be referred to as being in an undeployed position.

In some cases, the box 110 can comprise a shed or roof designed to enclose the motor 204. The box 110 can protect the motor 204 from the elements and can prevent tampering with the system 100 by unauthorized people. In some examples, the box 110 can also house other electronics associated with the tower 102. If necessary, the box 110 can also be climate controlled.

Figure 3:
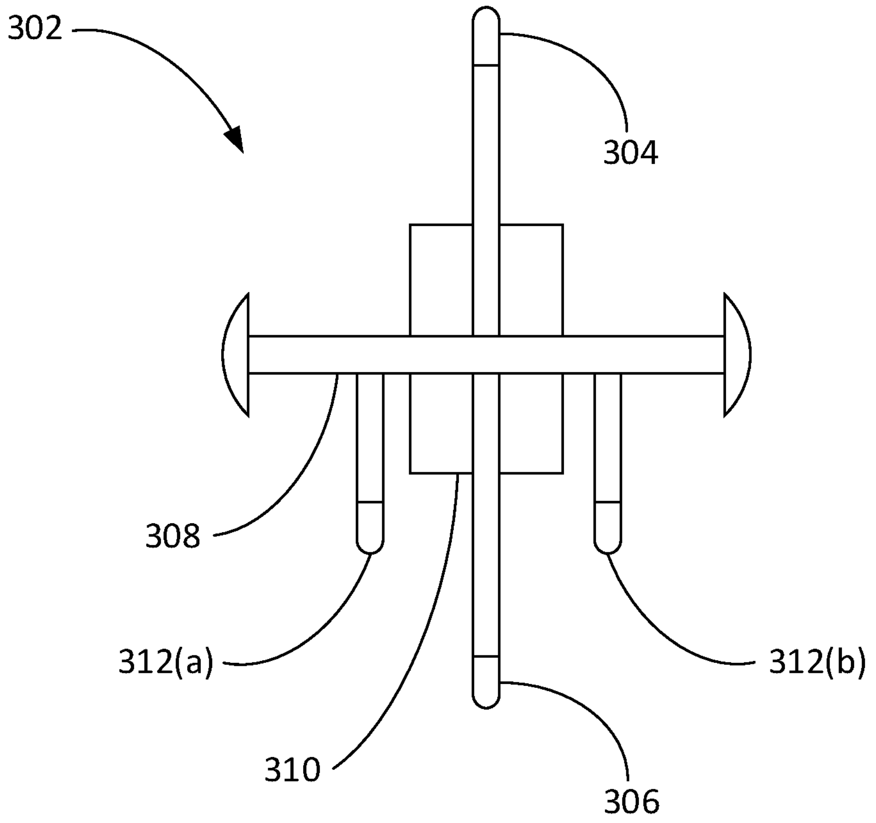
FIG. 3 is a detailed view of a climbing peg, in accordance with some examples of the present disclosure.

FIG. 3 illustrates an example climbing peg 302, which may be the same or similar to the climbing pegs 202. As discussed above, the modular ladder 112 may include multiple climbing pegs (e.g., climbing pegs 202(*a*), 202(*b*), and 202(*c*)), such as the climbing peg 302, configured to couple together such that the modular ladder 112 can be adjusted for length based on the size of the tower 102. In some cases, the climbing peg 302 may include a top portion 304 and a bottom portion 306 such that multiple climbing pegs 302 may be coupled together via a pin and/or a bolt such that the modular ladder is flexible when being taken down the tower 102. For example, the top portion 304 and the bottom portion 306 may include holes configured to receive a pin and/or a bolt to couple multiple climbing pegs 302 together. For example, as the modular ladder 112 moves down the tower, the modular ladder 112 may be configured to travel down the tower 102 and into the box 110, folding upon itself as the climbing pegs 302 are able to pivot at each connection point via the top portion 304 and the bottom portion 306. In some cases, the climbing peg 302 includes a crossbar 308 usable for a person to hold onto and/or step on to climb the tower 102. The crossbar 308 may be length long enough to allow the person to comfortably climb the tower 102 while being short enough to efficiently store the modular ladder 112. For example, the length of the crossbar 308 may range from 1 foot in length to 3 feet in length.

In some cases, the climbing peg 302 may include a backplate 310 usable to slide into a channel, such as the channel 114. For example, the backplate 310 may be configured to slide into the channel 114 while the other components of the climbing peg 302, such as the crossbar 308 remain on an exterior of the channel 114. In this way, the climbing peg 302 and the modular ladder 112 may be secured against the tower 102 while still being accessible to be used to climb the tower 102.

In some cases, the climbing pegs 302 may include fall protection loops 312(*a*) and 312(*b*), which may be the same or similar to fall protection loop 206, configured to couple with a safety harness of an entity climbing the tower 102.

Figure 4:
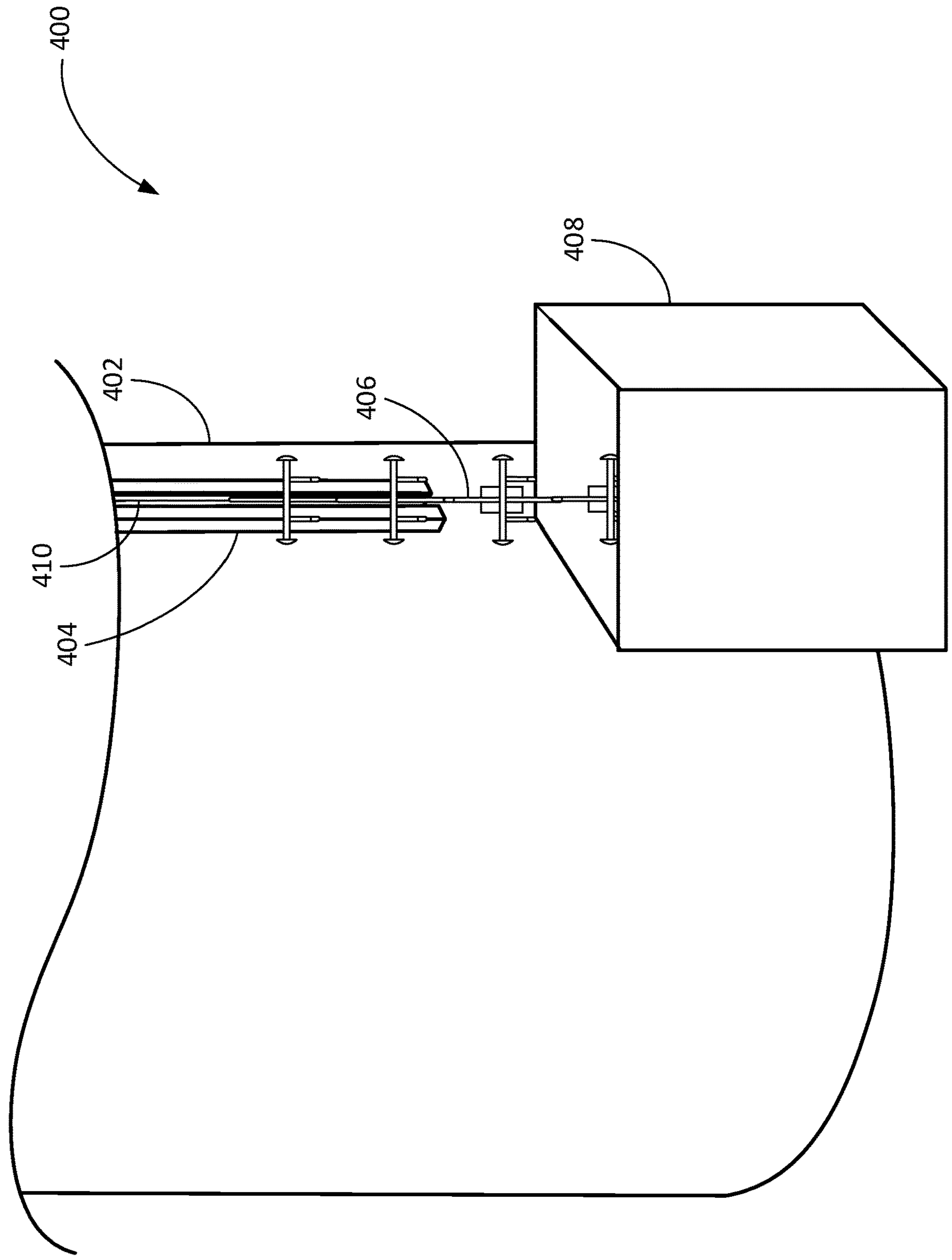
FIG. 4 is a perspective view of a modular ladder and channel, in accordance with some examples of the present disclosure.

FIG. 4 illustrates an example system 400, which may include a tower 402, a channel 404, a modular ladder 406, a box 408 and a transit-line 410, which may be the same or similar to the tower 102, the channel 114, the modular ladder 112, the box 110, and the transit-line 106, respectively, as discussed herein. The channel 404 may comprise an I-beam, for example, or a C-channel (shown) to provide a guideway for the modular ladder 406. In some examples, the channel 404 may comprise an I-beam, for example, and include one or more rollers riding on the outside of the channel 404. In some examples, the rollers can be spring-loaded (either inwardly or outwardly depending on the configuration) to provide some tension between the rollers and the channel 404. Of course, while described herein as "rollers," the rollers can also comprise plastic shoes, leaf springs, or other means configured to ride inside the C-channel (or outside the I-beam) to maintain the alignment of the modular ladder 406.

In some examples, to facilitate the deployment of the transit-line 410 and the modular ladder 406, the transit-line 410 may be coupled to a rotating mechanism, such as the motor 204 as illustrated in FIG. 2, located within the box 408. When the rotating mechanism is activated in a first direction, the transit-line 410 moves up the tower 402 and when the rotating mechanism is activated in a second direction that is opposite the first direction, the transit-line 410 may travel down the tower 402 towards the box 408. In this way, the modular ladder 406 may travel out of the box 408 and up the tower 402 partially located (e.g., via the backplate 310 of the climbing peg 302) within the channel 404 when in use, and retracted down the tower 402 back into the box 408 when not in use.

Figure 5:
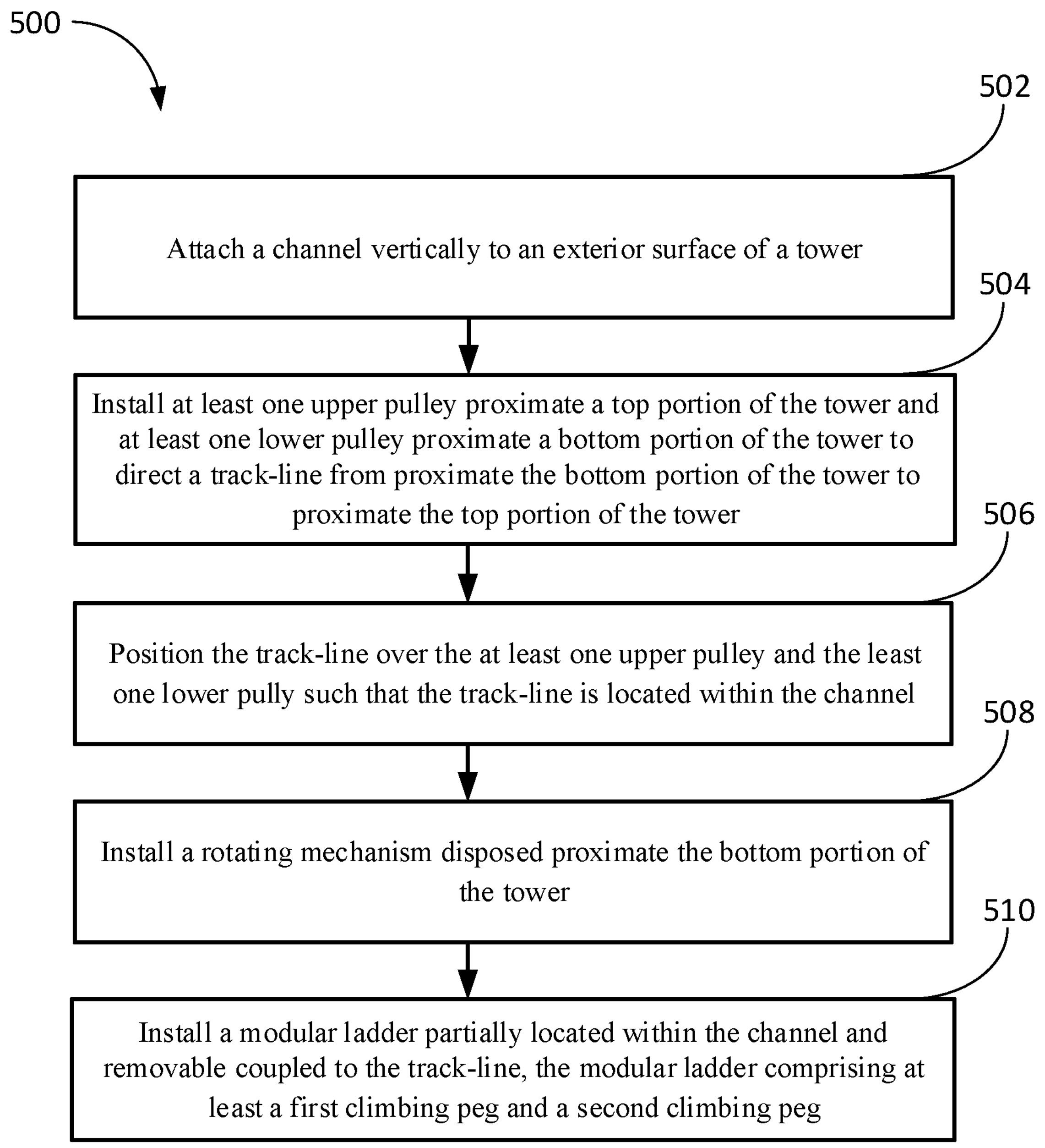
FIG. 5 depicts a method for installing the system discussed herein on a cell tower, in accordance with some examples of the present disclosure.
Figure 6:
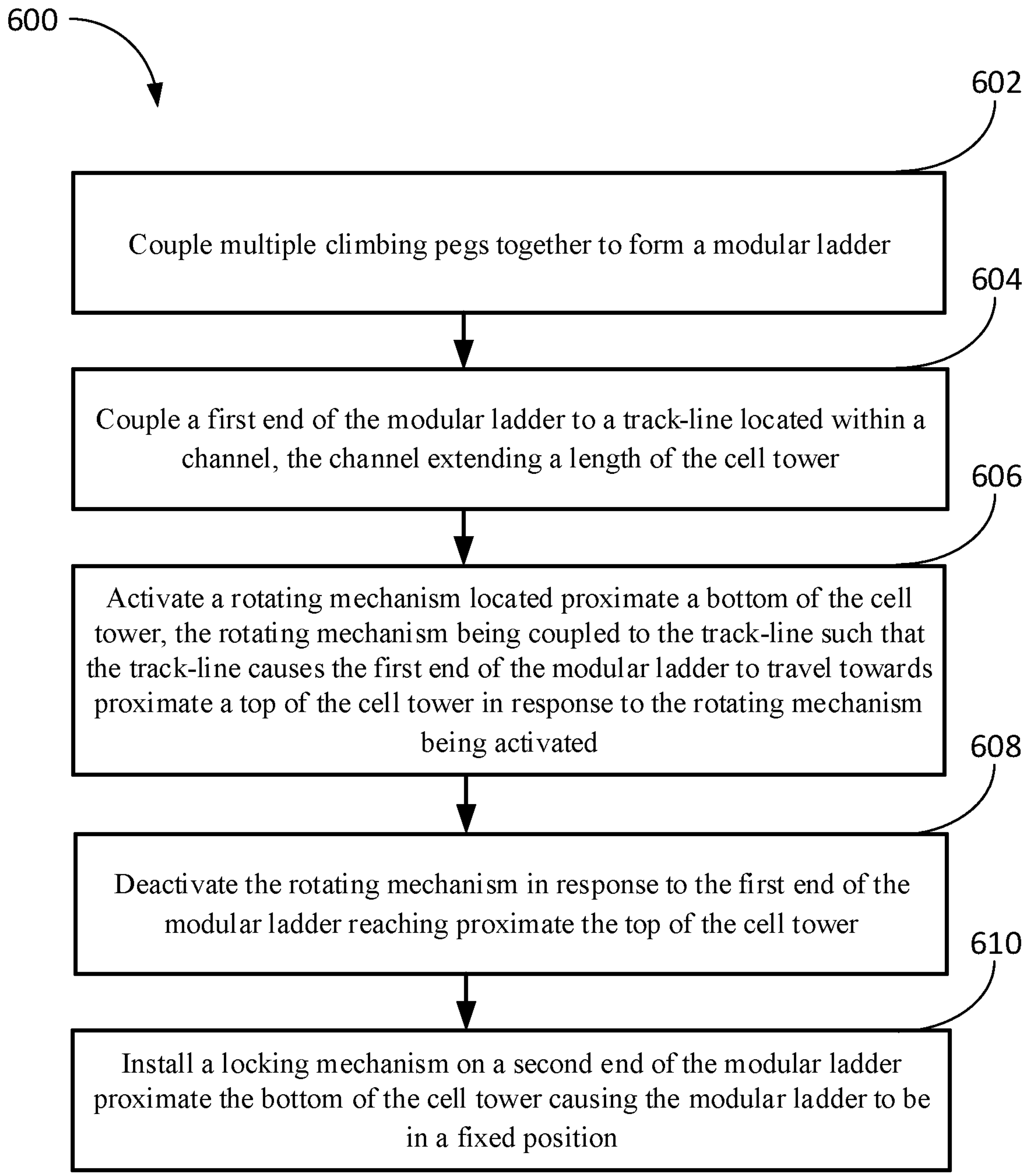
FIG. 6 depicts a method for using the system discussed herein to access the top of a cell tower, in accordance with some examples of the present disclosure.

FIGS. 5 and 6 are flow diagrams of illustrative processes that are illustrated as a collection of blocks in a logical flow graph, which represent a sequence of operations. The order in which the operations are described is not intended to be construed as a limitation, and any number of the described blocks can be omitted or combined in any order and/or in parallel to implement the processes.

As shown in FIG. 5, examples of the present disclosure can also comprise a method 500 for installing the system 100. Installation can be performed when the tower is being manufactured or when it is already in service. At 502, the method can begin with attaching a channel vertically to an exterior surface of a tower. As mentioned above, the channel is preferably straight and plumb to minimize the contact between the cable and the channel. In some examples, the channel can be welded to the inside or outside surface of the tower. In other examples, the channel can be attached to the tower using a series of brackets. The brackets can be adjustable for length to enable the channel to be mounted substantially plumb. The brackets can also be adjusted to account for any taper in the tower (i.e., cell towers generally have tapered poles, not cylindrical poles).

At 504, the method can include installing at least one upper pulley proximate a top portion of the tower and at least one lower pulley proximate a bottom portion of the tower to direct a track-line from proximate the bottom portion of the tower to proximate the top portion of the tower. For example, the transit-line 106 may have a length that is equal to at least twice a height of the tower 102 and form a loop around the pulleys 108. The transit-line 106 can comprise a suitably strong and flexible material such as, for example, nylon, polyester, or Spydura® rope. In some cases, the transit-line 106 can comprise stainless steel (e.g., a chain or a cable) or galvanized aircraft cable.

At 506 the method can include positioning the track-line over the at least one upper pulley and the least one lower pulley such that the track-line is located within the channel. For example, the channel 114 can be mounted on the inside or outside of the tower 102 with a plurality of mounts. The mounts can comprise, for example, brackets, I-bolts, or clamps to affix the channel 114 to the tower 102. It is preferably that the channel 114 be substantially straight to prevent excessive wear from the transit-line 106 rubbing on the inside of the channel 114 during use. In some examples, it may be preferable to mount the channel 114 on the inside of the tower 102 to provide protection from the elements, among other things. In other examples, it may be preferable to mount the channel 114 on the outside of the tower to facilitate installation, for example.

Of course, because the transit-line 106 can be fairly flexible, perfect alignment is not required. Indeed, substantial bends could be introduced into the channel 114 to, for example, avoid existing structures or components in the tower 102. In this case, the channel 114 can comprise wear pads, for example, in locations where the transit-line 106 contacts the channel 114. The wear pads can be sufficiently hard that they are not significantly affected by the transit-line 106 or could be replaceable (i.e., "sacrificial"). The channel 114 can comprise, for example, square or round pipe. The channel 114 can comprise steel, aluminum, iron, or PVC, among other things.

The system 100 can also include a plurality of pulleys 108, such as the pulley 108(*a*) located at the top of the tower 102 (illustrated in FIG. 1) and they pulley 108(*b*) located at the bottom of the tower 102 to guide the transit-line 106. In this manner, the transit-line 106 can travel vertically up the tower 102 inside the channel 114, turn 180 degrees over the first pulley 108*a*, and then travel back down the outside of the tower. This pulley configuration can be achieved using a material (e.g., cable, chain, etc.) that is sufficiently flexible and resilient to be turned 180 degrees in a relatively small radius.

At 508, the method can include installing a rotating mechanism disposed proximate the bottom portion of the tower. For example, to facilitate the deployment of the transit-line 410 and the modular ladder 406, the transit-line 410 may be coupled to a rotating mechanism, such as the motor 204 as illustrated in FIG. 2, located within the box 408. When the rotating mechanism is activated in a first direction, the transit-line 410 moves up the tower 402 and when the rotating mechanism is activated in a second direction that is opposite the first direction, the transit-line 410 may travel down the tower 402 towards the box 408. In this way, the modular ladder 406 may travel out of the box 408 and up the tower 402 partially located (e.g., via the backplate 310 of the climbing peg 302) within the channel 404 when in use, and retracted down the tower 402 back into the box 408 when not in use.

At 510, the method can include installing a modular ladder partially located within the channel and removable coupled to the track-line, the modular ladder comprising at least a first climbing peg and a second climbing peg. For example, the modular ladder 112 may include multiple climbing pegs (e.g., climbing pegs 202(*a*), 202(*b*), and 202(*c*)), such as the climbing peg 302, configured to couple together such that the modular ladder 112 can be adjusted for length based on the size of the tower 102. In some cases, the climbing peg 302 may include a top portion 304 and a bottom portion 306 such that multiple climbing pegs 302 may be coupled together via a pin and/or a bolt such that the modular ladder is flexible when being taken down the tower 102. For example, the top portion 304 and the bottom portion 306 may include holes configured to receive a pin and/or a bolt to couple multiple climbing pegs 302 together. For example, as the modular ladder 112 moves down the tower, the modular ladder 112 may be configured to travel down the tower 102 and into the box 110, folding upon itself as the climbing pegs 302 are able to pivot at each connection point via the top portion 304 and the bottom portion 306. In some cases, the climbing peg 302 includes a crossbar 308 usable for a person to hold onto and/or step on to climb the tower 102. The crossbar 308 may be length long enough to allow the person to comfortably climb the tower 102 while being short enough to efficiently store the modular ladder 112. For example, the length of the crossbar 308 may range from 1 foot in length to 3 feet in length.

Additionally and/or alternatively, the method 500 may include the rotating mechanism being coupled to the at least one lower pulley such that the rotating mechanism is configured to move the track-line from proximate the bottom portion of the tower to proximate the top portion of the tower and in response to the track-line moving, the modular ladder travels to proximate the top portion of the tower.

Examples of the present disclosure can also comprise a method 600 of using the system. As discussed above, the method 600 can utilize a rotating mechanism causing a modular ladder to extend to a top of a cell tower.

At 602, the method can include coupling multiple climbing pegs together to form a modular ladder. For example, the modular ladder 112 may include multiple climbing pegs (e.g., climbing pegs 202(*a*), 202(*b*), and 202(*c*)), such as the climbing peg 302, configured to couple together such that the modular ladder 112 can be adjusted for length based on the size of the tower 102. In some cases, the climbing peg 302 may include a top portion 304 and a bottom portion 306 such that multiple climbing pegs 302 may be coupled together via a pin and/or a bolt such that the modular ladder is flexible when being taken down the tower 102. For example, the top portion 304 and the bottom portion 306 may include holes configured to receive a pin and/or a bolt to couple multiple climbing pegs 302 together. For example, as the modular ladder 112 moves down the tower, the modular ladder 112 may be configured to travel down the tower 102 and into the box 110, folding upon itself as the climbing pegs 302 are able to pivot at each connection point via the top portion 304 and the bottom portion 306. In some cases, the climbing peg 302 includes a crossbar 308 usable for a person to hold onto and/or step on to climb the tower 102. The crossbar 308 may be length long enough to allow the person to comfortably climb the tower 102 while being short enough to efficiently store the modular ladder 112. For example, the length of the crossbar 308 may range from 1 foot in length to 3 feet in length.

At 604, the method can include coupling a first end of the modular ladder to a track-line located within a channel, the channel extending a length of the cell tower. For example, the channel is preferably straight and plumb to minimize the contact between the cable and the channel. In some examples, the channel can be welded to the inside or outside surface of the tower. In other examples, the channel can be attached to the tower using a series of brackets. The brackets can be adjustable for length to enable the channel to be mounted substantially plumb. The brackets can also be adjusted to account for any taper in the tower (i.e., cell towers generally have tapered poles, not cylindrical poles). In some examples, the system 100 can also include a plurality of pulleys 108, such as the pulley 108(*a*) located at the top of the tower 102 (illustrated in FIG. 1) and they pulley 108(*b*) located at the bottom of the tower 102 to guide the transit-line 106. In this manner, the transit-line 106 can travel vertically up the tower 102 inside the channel 114, turn 180 degrees over the first pulley 108*a*, and then travel back down the outside of the tower. This pulley configuration can be achieved using a material (e.g., cable, chain, etc.) that is sufficiently flexible and resilient to be turned 180 degrees in a relatively small radius.

At 606, the method can include activating a rotating mechanism located proximate a bottom of the cell tower, the rotating mechanism being coupled to the track-line such that the track-line causes the first end of the modular ladder to travel towards proximate a top of the cell tower in response to the rotating mechanism being activated and at 608, the method can include deactivating the rotating mechanism in response to the first end of the modular ladder reaching proximate the top of the cell tower. For example, the rotating mechanism may comprise the motor 204, which may comprise, for example, an electric, hydraulic, or pneumatic motor for activating the transit-line 106 and for lifting the modular ladder 112 up the tower 102. As such, the motor 204 can have a sufficient power rating to pull the transit-line 106 and the modular ladder 112 without overheating or failing. In some examples, the motor 204 can have power in excess of what is required to provide a safety margin. In some cases, the motor 204 may include a brake 208 that can use the motor 204. In other words, the motor 204 can include electronics to make the motor 204 provide an opposing force to the transit-line 106 being activated. This can be achieved, for example, by reversing the polarity of the motor 204 (if electric) or reversing the flow of fluid to the motor (if hydraulic or pneumatic) 204 in order to cause the transit-line 106 to travel in opposite directions.

At 608, the method can include deactivating the rotating mechanism in response to the first end of the modular ladder reaching proximate the top of the cell tower. For example, At 610, the method can include installing a locking mechanism on a second end of the modular ladder proximate the bottom of the cell tower causing the modular ladder to be in a fixed position. For example, the motor 204 can include a physical brake 208. In this configuration, the brake 208 can act on a drum of the motor 204 or directly on the transit-line 106. In some examples, the brake 208 can comprise a caliper, for example, that acts directly on a flange on the drum of the motor 204. In other examples, the brake 208 can comprise a clamp, or other means, that applies friction directly on the transit-line 106. The brake 208 can enable the descent of the modular ladder 112 from the top of the tower 102 to be slowed or stopped. In some examples, the brake 208 can also hold the transit-line 106 and the modular ladder 112 in the retracted position when not in use.

The system(s) and method(s) described herein can enable workers to service cell towers that are otherwise inaccessible. Stealth cell towers, for example, disguised as trees or other objects, do not have ladders or climbing pegs to further hide their true purpose. The system(s) and method(s) described herein enables workers access to the top of the tower without having to pay for expensive cranes. The system(s) and method(s) may use a modular ladder and a system of pulleys permanently installed on the tower to lift the modular ladder from the bottom of the tower to the top (and anywhere in between). The system(s) and method(s) can be installed on new towers prior to installation or retrofitted to existing towers.

While several possible examples are disclosed above, examples of the present disclosure are not so limited. For instance, while systems and methods for access to stealth cell towers has been disclosed, other systems or subsystems could be utilized in a similar manner without departing from the spirit of the disclosure. In addition, while generally referred to above as cell towers, the system can be used on many types of structures that are otherwise inaccessible (e.g., telephone poles, high tension power towers, etc.). Finally, the order of steps in many of the methods discussed herein could be changed without significantly affecting the functionality of the disclosure. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed:

1. A system for scaling a tower, the system comprising:

a track-line with a length equal to at least twice a height of the tower;

a channel disposed vertically on the tower to house the track-line from proximate a bottom of the tower to proximate a top of the tower;

a modular ladder partially located within the channel and removable coupled to the track-line, the modular ladder comprising at least a first climbing peg and a second climbing peg, wherein at least one of the first climbing peg or the second climbing peg includes:

a vertical portion including a top connection point and a bottom connection point for connecting multiple climbing pegs together; and a horizontal portion perpendicularly coupled to the vertical portion, the horizontal portion comprising a crossbar usable to be at least one of held on to or stepped on; and a rotating mechanism disposed proximate the bottom of the tower attached to a first end of the track-line to pull the track-line in a first direction;

wherein the rotating mechanism moves the track-line such that, in response to the track-line pulling in the first direction, the modular ladder travels to proximate the top of the tower.

2. The system of claim 1, wherein the tower is a communications tower configured without pegs or a fixed ladder.

3. The system of claim 1, further comprising a lock box located proximate the bottom of the tower, the lock box being configured to house the rotating mechanism and the modular ladder when the modular ladder is in an undeployed position.

4. The system of claim 1, wherein the first climbing peg and the second climbing peg are removably coupled to one another.

5. The system of claim 1, further comprising a locking mechanism located proximate the bottom of the tower configured to couple with the modular ladder such that the modular ladder is in a fixed position once the modular ladder travels to proximate the top of the tower.

6. The system of claim 1, further comprising a harness wearable by a worker and removably coupled to at least one of the channel or the modular ladder.

7. The system of claim 1, wherein the track-line comprises a chain or a cable.

8. The system of claim 1, wherein at least one of the first climbing peg or the second climbing peg includes a fall protection loop configured to couple with a safety harness.

9. A method comprising:

attaching a channel vertically to an exterior surface of a tower;

installing at least one upper pulley proximate a top portion of the tower and at least one lower pulley proximate a bottom portion of the tower to direct a track-line from proximate the bottom portion of the tower to proximate the top portion of the tower;

positioning the track-line over the at least one upper pulley and the least one lower pulley such that the track-line is located within the channel;

installing a rotating mechanism disposed proximate the bottom portion of the tower; and installing a modular ladder partially located within the channel and removable coupled to the track-line, the modular ladder comprising at least a first climbing peg and a second climbing peg, wherein at least one of the first climbing peg or the second climbing peg includes:

a vertical portion including a top connection point and a bottom connection point for connecting multiple climbing pegs together; and a horizontal portion perpendicularly coupled to the vertical portion, the horizontal portion comprising a crossbar usable to be at least one of held on to or stepped on;

wherein the rotating mechanism is coupled to the at least one lower pulley such that the rotating mechanism is configured to move the track-line from proximate the bottom portion of the tower to proximate the top portion of the tower and in response to the track-line moving, the modular ladder travels to proximate the top portion of the tower.

10. The method of claim 9, wherein the rotating mechanism comprises a powered motor.

11. The method of claim 9, further comprising installing a lock box located proximate the bottom portion of the tower, the lock box being configured to house the rotating mechanism and the modular ladder when the modular ladder is in an undeployed position.

12. The method of claim 9, further comprising coupling the first climbing peg to the second climbing peg to form the modular ladder.

13. The method of claim 9, further comprising installing a locking mechanism located proximate the bottom portion of the tower configured to couple with the modular ladder such that the modular ladder is in a fixed position once the modular ladder travels to proximate the top portion of the tower.

14. The method of claim 9, wherein at least one of the first climbing peg or the second climbing peg includes a fall protection loop configured to couple with a safety harness.

15. The method of claim 9, wherein the track-line comprises a belt.

16. The method of claim 9, further comprising installing a harness wearable by a worker and removably coupled to at least one of the channel or the modular ladder.

17. A method for scaling a cell tower using a self-contained system, the method comprising:

coupling multiple climbing pegs together to form a modular ladder, wherein at least one of the multiple climbing pegs includes:

a vertical portion including a top connection point and a bottom connection point for connecting the multiple climbing pegs together; and a horizontal portion perpendicularly coupled to the vertical portion, the horizontal portion comprising a crossbar usable to be at least one of held on to or stepped on;

coupling a first end of the modular ladder to a track-line located within a channel, the channel extending a length of the cell tower;

activating a rotating mechanism located proximate a bottom of the cell tower, the rotating mechanism being coupled to the track-line such that the track-line causes the first end of the modular ladder to travel towards proximate a top of the cell tower in response to the rotating mechanism being activated;

deactivating the rotating mechanism in response to the first end of the modular ladder reaching proximate the top of the cell tower; and installing a locking mechanism on a second end of the modular ladder proximate the bottom of the cell tower causing the modular ladder to be in a fixed position.

18. The method of claim 17, wherein the rotating mechanism comprises a powered motor.

19. The method of claim 17, further comprising installing a lock box located proximate the bottom of the cell tower, the lock box being configured to house the rotating mechanism and the modular ladder when the modular ladder is in an undeployed position.

20. The method of claim 17, wherein the track-line comprises at least one of a belt or a chain.

* * * * *